United States Patent [19]
Inami et al.

[11] Patent Number: 5,778,531
[45] Date of Patent: Jul. 14, 1998

[54] METHOD OF MANUFACTURING CYLINDER HEAD FOR ENGINE

[75] Inventors: Junichi Inami; Shuhei Adachi, both of Iwata, Japan

[73] Assignee: Yamaha Hatsudoki Kabushiki Kaisha, Iwata, Japan

[21] Appl. No.: 713,809

[22] Filed: Sep. 13, 1996

[51] Int. Cl.⁶ .................................................. B23P 15/00
[52] U.S. Cl. .................................. 29/888.06; 29/888.44; 123/188.8
[58] Field of Search ........................ 123/193.5, 193.3, 123/188.8; 251/359; 29/888.06, 888.4, 888.44, 888.46

[56] References Cited

U.S. PATENT DOCUMENTS

| | | |
|---|---|---|
| 1,397,167 | 1/1921 | Hopper . |
| 1,720,486 | 7/1929 | Leipert . |
| 1,795,433 | 3/1931 | Leipert . |
| 2,165,311 | 7/1939 | Stancliff . |
| 3,428,035 | 2/1969 | Stefan . |
| 3,667,110 | 6/1972 | Gwyn, Jr. . |
| 3,728,940 | 4/1973 | Peterson . |
| 3,769,101 | 10/1973 | Woodward . |

(List continued on next page.)

FOREIGN PATENT DOCUMENTS

| | | |
|---|---|---|
| 0051300 | 5/1982 | European Pat. Off. . |
| 0064367 | 11/1982 | European Pat. Off. . |
| 0092683 | 11/1983 | European Pat. Off. . |
| 0168130 | 1/1986 | European Pat. Off. . |
| 0195177 | 9/1986 | European Pat. Off. . |
| 0224345 | 10/1986 | European Pat. Off. . |
| 0228282 | 7/1987 | European Pat. Off. . |
| 0259023 | 8/1987 | European Pat. Off. . |
| 873203 | 7/1942 | France . |
| 1352656 | 4/1963 | France . |
| 2263381 | 10/1975 | France . |
| 2694788 | 2/1994 | France . |
| 698709 | 11/1940 | Germany . |
| 3613299 | 10/1987 | Germany . |
| 3928597 | 3/1991 | Germany . |
| 4036614 | 5/1991 | Germany . |
| 4322435 | 1/1995 | Germany . |
| 53-138945 | 12/1978 | Japan . |
| 56-88909 | 7/1981 | Japan . |
| 1-186261 | 7/1989 | Japan . |
| 3-210961 | 9/1991 | Japan . |
| 5-287324 | 11/1993 | Japan . |
| 5-332106 | 12/1993 | Japan . |
| 5-340299 | 12/1993 | Japan . |
| 399914 | 10/1933 | United Kingdom . |
| 9427767 | 12/1994 | WIPO . |

OTHER PUBLICATIONS

Patent Abstracts of Japan, vol. 96, No. 001 & JP-A-08 004581.
Patent Abstracts of Japan, vol. 010, No. 246 & JP-A-61 076742.
Patent Abstracts of Japan, vol. 012, No. 381 & JP-A-63 131853.
Patent Abstracts of Japan, vol. 95, No. 004 & JP-A-07 103070.
Patent Abstracts of Japan, vol. 006, No. 059, & JP-A-57 000540.
Database WPI, Sec. EI, Wk 9018; Class S03, An 90-138420.
Patent Abstracts of Japan, vol. 007, No. 173 & JP-A-58 077117.
Patent Abstracts of Japan, vol. 013, No. 506 & JP-A-01 203607.
Patent Abstracts of Japan, vol. 007, No. 173 (M-232), 30-7-83 & JP-A-58 077115.

*Primary Examiner*—Weilun Lo
*Attorney, Agent, or Firm*—Knobbe, Martens, Olson & Bear LLP

[57] ABSTRACT

An improved method of forming a bonded valve seat for a cylinder head wherein the configuration of the insert ring and cylinder head recess is such to ensure good bonding over the entire area and the proper amount of sinking of the insert ring into the cylinder head.

5 Claims, 13 Drawing Sheets

U.S. PATENT DOCUMENTS

| | | | |
|---|---|---|---|
| 3,795,511 | 3/1974 | Niimi et al. ............. 29/888.44 |
| 3,944,777 | 3/1976 | Porat . |
| 4,046,305 | 9/1977 | Brown et al. . |
| 4,092,223 | 5/1978 | Kaufman . |
| 4,502,433 | 3/1985 | Becker Jr. et al. . |
| 4,543,925 | 10/1985 | Ruf . |
| 4,556,022 | 12/1985 | Yamada et al. . |
| 4,723,518 | 2/1988 | Kawasaki et al. . |
| 4,734,968 | 4/1988 | Kuroishi et al. . |
| 4,831,976 | 5/1989 | Pozniak et al. . |
| 4,873,983 | 10/1989 | Ogawa et al. . |
| 4,896,638 | 1/1990 | Shepley . |
| 4,934,351 | 6/1990 | Shepley . |
| 5,020,490 | 6/1991 | Seko . |
| 5,042,151 | 8/1991 | Roush . |
| 5,054,682 | 10/1991 | Mistry . |
| 5,060,374 | 10/1991 | Findlanl et al. . |
| 5,119,784 | 6/1992 | Hashimoto et al. . |
| 5,119,785 | 6/1992 | Saito et al. . |
| 5,138,988 | 8/1992 | Distelrath et al. . |
| 5,215,050 | 6/1993 | Ruckert et al. ............ 123/193.5 |
| 5,330,097 | 7/1994 | Inoue . |
| 5,353,501 | 10/1994 | Naugle et al. . |
| 5,431,136 | 7/1995 | Kenmoku et al. . |
| 5,492,091 | 2/1996 | Russ . |
| 5,586,530 | 12/1996 | Adachi et al. ............ 123/188.8 |
| 5,649,358 | 7/1997 | Adachi et al. ............ 29/888.4 |

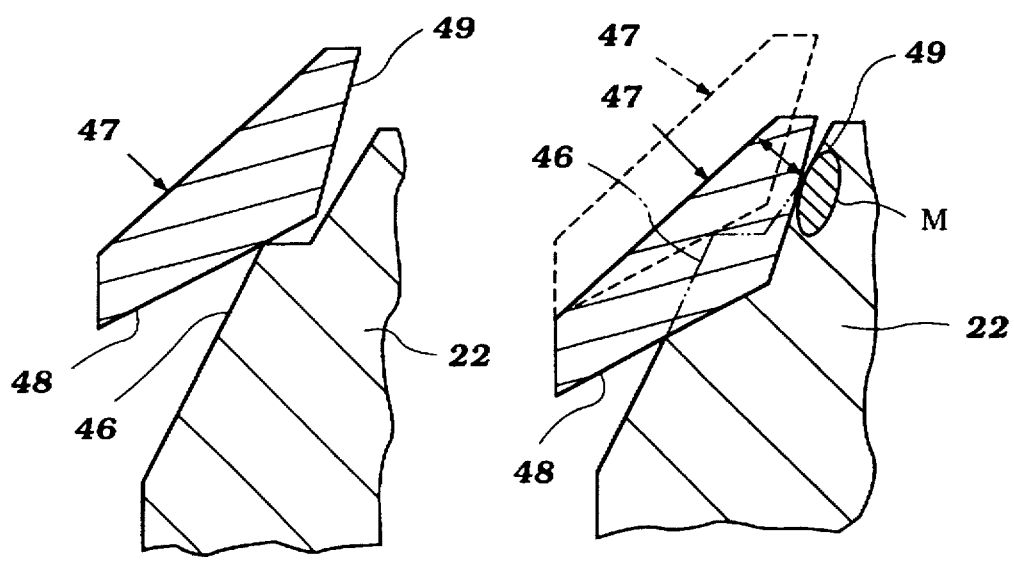
*Figure 6a*     *Figure 6b*

METHOD OF MANUFACTURING CYLINDER HEAD FOR ENGINE

BACKGROUND OF THE INVENTION

This invention relates to a method of manufacturing a cylinder head for an engine and more particularly to an improved arrangement for forming the valve seats for internal combustion engines.

In internal combustion engines and particularly those having high performance, it is the practice to employ a cylinder head that is formed from a light-weight material, such as an aluminum or an aluminum alloy casting. In order to assure long life and good valve seating, the intake and exhaust passages that extend through the cylinder head terminate in valve seats that are formed from a material that is dissimilar from that of the basic cylinder head casting. Normally, sintered ferrous materials are utilized for this purpose. These insert rings actually form the valve seating surface with which the poppet valves cooperate to control the flow into and out of the combustion chamber.

Conventionally, the valve seat inserts have been formed in the cylinder head by pressing in the insert rings into recesses formed in the cylinder head at the portion of their flow passages that communicate with the combustion chamber. There are a number of disadvantages to the use of this pressed-in technique.

First and foremost, the pressing technique places stresses on not only the valve seat, but also the cylinder head that can cause cracking. Obviously, if the valve seat becomes dislodged from the cylinder head during engine operation, substantial problems can occur. In addition to these basic problems, this type of valve seat formation also provides relatively poor heat transfer between the insert ring and the cylinder head. As a result the valve seats and valves operate at relatively high temperatures and this adversely affects the life of the components and also restricts the performance of the engine.

A wide variety of other methods have been proposed for forming the valve seat inserts. One of these methods employs a laser cladding technique wherein the harder material is, in effect, welded or clad to the cylinder head. These welding or cladding techniques, be they laser or other types, however, do not completely solve the problem. Because of the fact that there is a molten state that exists at least along the cylinder head and frequently along the insert ring, voids and gas pockets may occur that further reduce the heat transfer.

There has a been proposed, therefore, an arrangement wherein the insert ring is metallurgically bonded rather than welded into place into the cylinder head. This bonding technique employs the use of an insert ring that is pressed into a recess formed in the cylinder head at the base of the flow passage. An electrical current or other means is provided for generating heat during the pressing process. The amount of head generated is not sufficient to cause any melting of the materials that would affect alloying, but rather results in a more plastic flow that forms a metallurgical bond between the material of the cylinder head and that of the insert ring. As a result, there are no voids in the resulting construction and the heat transfer is significantly improved. In addition, this technique permits the use of smaller insert rings and, accordingly, larger flow passages. The technique also permits the use of flow passages that have their configuration determined by gas flow dynamics and not by the shape of the insert ring.

Such an arrangement is disclosed in the co-pending application entitled, "Valve Seat Bonded Cylinder Head and Method for Producing Same," application Ser. No., 08/483, 246, filed Jun. 7, 1995 and assigned to the assignee hereof. In addition, certain of these techniques are also described in the co-pending application entitled "VALVE SEAT," application Ser. No. 08/278,026, filed Jul. 20, 1994, now U.S. Pat. No. 5,649,358, and also assigned to the Assignee hereof. This invention relates to an improved configuration and method for forming such valve seats.

As will be described later, the configuration of the insert and the method of heating are important to ensure that the bond between the insert and the cylinder head material is substantially uniform, free of voids and also does not result in any substantial melting and resulting alloying of the material and, particularly that of the cylinder head.

It is, therefore, a principal object of this invention to provide an improved method of manufacturing a cylinder head for an engine.

It is a further object of this invention to provide an improved method for manufacturing valve seats in cylinder heads for internal combustion engines.

It is a further object of this invention to provide an improved configuration for the insert ring and recess in the cylinder head that facilitates this technique.

It is a still further object of this invention to provide an improved heat control system for controlling the heat applied to the joint during the bonding technique.

SUMMARY OF THE INVENTION

This invention is adapted to be embodied in a method for forming a bonded valve seat for an internal combustion engine that is comprised of a base cylinder head and an insert ring that are formed from a different material that is metallurgically bonded to the base material of the cylinder head. The cylinder head is formed with a flow passage that terminates within a surface of the cylinder head that forms, in part, a combustion chamber for the engine. This flow passage is formed from a recess or cavity that has a pair of angularly related portions that are joined by a planar surface that extends around the flow passage and generally perpendicularly to the flow passage. The insert ring is formed from an annulus of material different from that of the cylinder head and which has a pair of angularly inclined surfaces that are adapted to be brought into facing relationship with the cylinder head recess and metallurgically bonded thereto. The configuration of the cylinder head recess and the insert ring is such that the edge of the cylinder head recess at the inner peripheral edge of the planar surface will contact the lower and innermost angularly inclined outer surface of the insert ring so as to ensure that the initial bonding and liquification of the cylinder head material will occur in this area and be more uniform during the resulting pressing and bonding operation.

BRIEF DESCRIPTION OF THE DRAWINGS

FIG. 6 is a two-part view showing the initial starting condition on the left in view and final bonding steps in accordance with another potential problem that could result in excess melting of the cylinder head material as seen in the right-hand view b.

DETAILED DESCRIPTION OF THE PREFERRED EMBODIMENTS OF THE INVENTION

Figure 1:
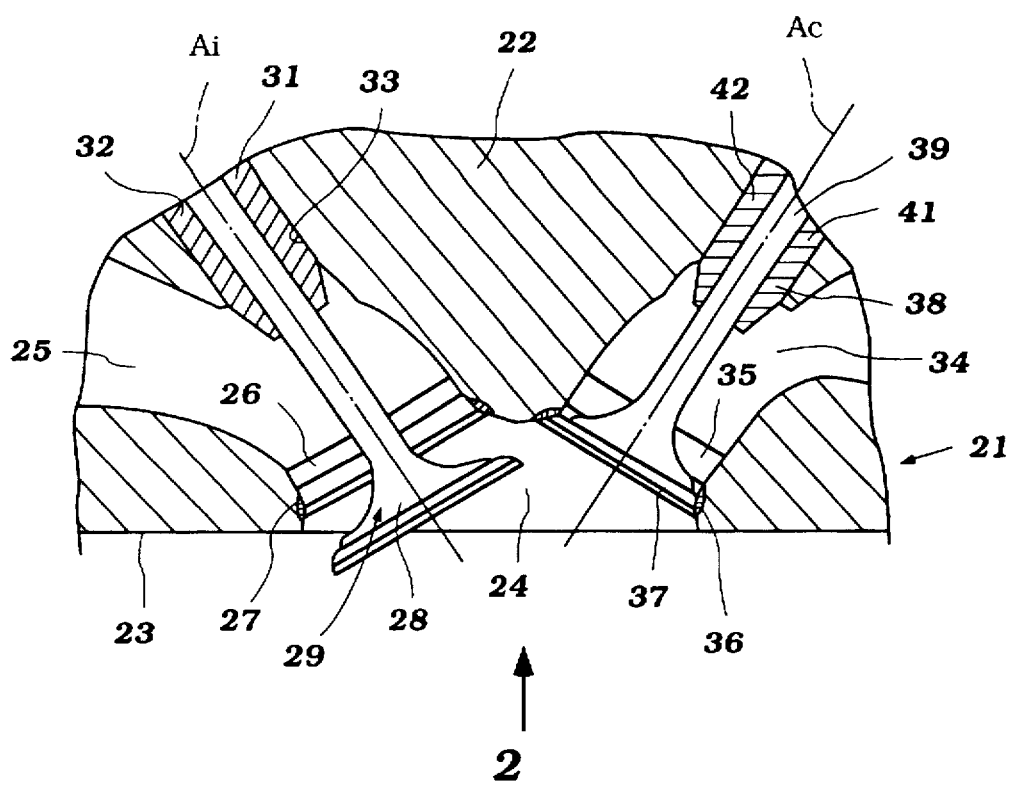
FIG. 1 is a cross-sectional view taken through a portion of a cylinder head embodying a bonded valve seat formed in accordance with one of the embodiments of the invention.
Figure 2:
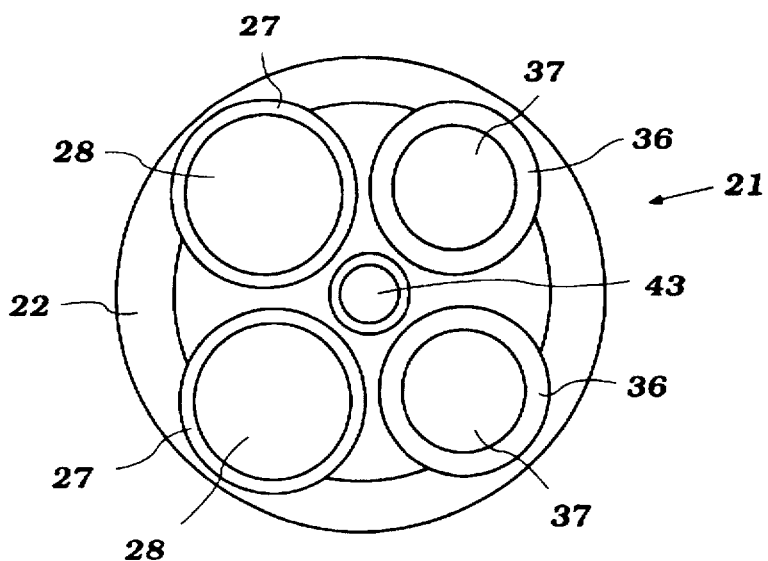
FIG. 2 is a bottom plan view showing the combustion chamber recess of the cylinder head and valve seat and valve placement therein and is taken looking in the direction of the arrow 2 in FIG. 1.
Figure 3:
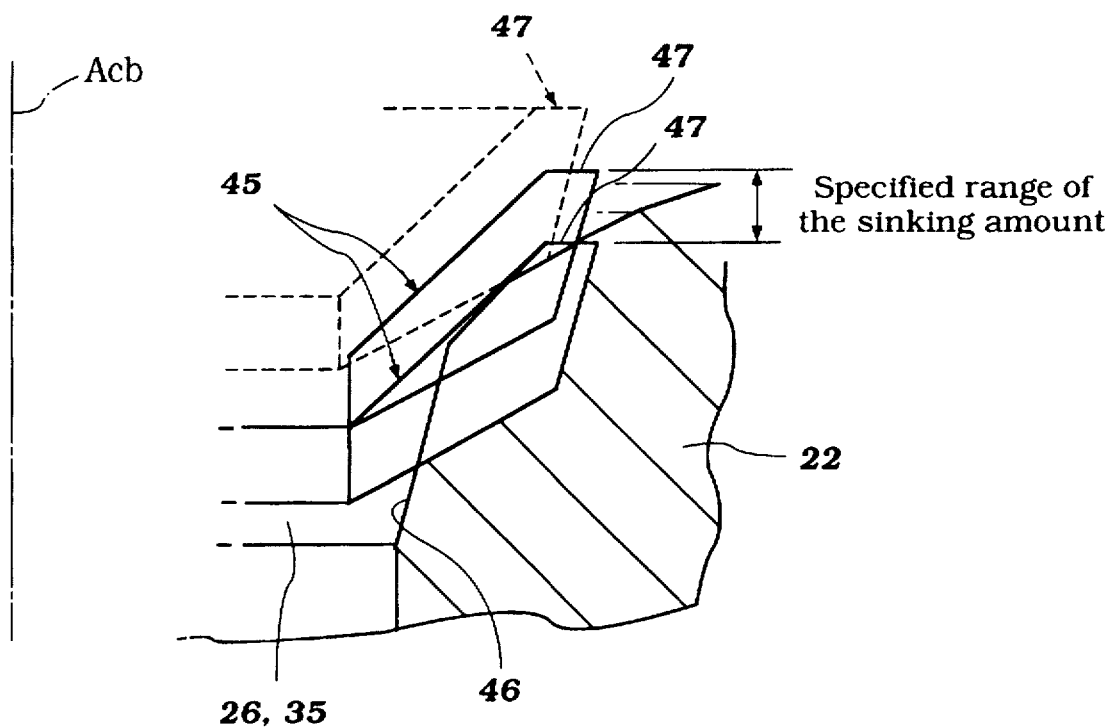
FIG. 3 is an enlarged cross-sectional view taken through a cylinder head embodying a bonded valve seat constructed in accordance with the invention and shows the various phases during the bonding technique leading up to the preferred resulting valve seat.

Referring now in detail to the drawings and initially to FIGS. 1 and 2, a cylinder head for an internal combustion engine is depicted partially and is identified generally by the reference numeral 21. The cylinder head 21 is, in the illustrated embodiment, of the four-valve per cylinder type. Although the invention is described in conjunction with such a number of valves per cylinder, it will be readily apparent to those skilled in the art that the invention may be practiced with engines having a wide variety of number and placement of valves. The bonding technique employed to form the valve seats, however, facilitates the use of multiple valves per cylinder. Therefore, the invention has greater potential utility with multiple valve engines, but its use is obviously not so limited.

The cylinder head assembly 21 includes a main cylinder head casting 22 that is formed from a material, such as an aluminum or aluminum alloy. In accordance with a preferred form of the invention, the aluminum alloy of the cylinder head body 22 is aluminum silicon magnesium based aluminum alloy specified as AC4C in the Japanese Industrial Standard (JIS). This material is employed because it provides a better bonding strength, but again the invention is not so limited to the use of this material.

The base cylinder head casting 22 has a lower surface 23 that is held in sealing relationship with an associated cylinder block (not shown). Combustion chamber recesses 24 are formed in this surface 23 and will be in confronting relationship with the cylinder block cylinder bores. Thus, the combustion chamber recesses 24 form a major portion of the volume of the combustion chamber of the engine when the piston associated with the cylinder bore and which is not illustrated is at its top dead center position.

Since the cylinder head 21 is of the four-valve type, a pair of intake passages 25 extend from inlet openings in an outer surface of the cylinder head and terminate at intake ports 26 that communicate with the combustion chamber recess 24. Each valve port 26 is formed at its termination with a bonded-type valve seat, indicated generally by the reference numeral 27. This valve seat 27 is formed with a sealing surface that is engaged by the head 28 of a respective poppet-type intake valve 29 to control the flow therethrough. The poppet-type intake valves 29 have stem portions 31 that are slidably supported in valve guides 32 that are pressed or otherwise secured in corresponding openings 33 of the base cylinder head material 22. These intake valves 29 reciprocate about respective axes indicated at $A_i$ and are operated by any known type of known valve actuating mechanism.

A pair of exhaust passages 34 are formed in the base cylinder head casting 22 on the side opposite the intake passages 25. Although an arrangement wherein two intake passages 25 and two exhaust passages 34 are employed have been described and illustrated, it will be readily apparent to those skilled in the art that Siamese-type passages rather than separate individual passages may be utilized.

The exhaust passages 34 extend from exhaust ports 35 which communicate with the combustion chamber recess 24 at bonded type valve seats 36. The heads 37 of poppet-type exhaust valves 38 cooperate with the valve seats 36 to control the flow of exhaust gases through the exhaust passages 34.

The exhaust valves 38 have valve stems 39 that are slidably supported in valve guides 41. The valve guides 41 are, in turn, pressed or otherwise secured in corresponding bores 42 formed in the cylinder head casting 22. The exhaust valves 38 and, specifically their stems 39, reciprocate about axes $A_e$ which lie in a common plane and which may be disposed at a somewhat lesser angle to a plane containing the cylinder bore axis than the intake valve axes $A_i$.

Disposed generally centrally within the combustion chamber recess 24 is a spark plug receiving opening 43. This opening receives a spark plug so that its spark gap will be positioned centrally in the combustion chamber recess 24 for firing the charge therein.

As should be readily apparent, the intake valve seats 27 and exhaust valve seats 36 are formed by insert rings, one of which is shown in the remaining figures and is identified generally by the reference numeral 45. These insert rings 45 are bonded within recesses 46 formed in the material of the cylinder head casting 22 at the respective ports 26 or 35.

FIGS. 3–6 are employed to explain certain of the problems prevalent with prior art-type constructions and also so as to describe the features which distinguish the invention from the prior art. Specifically, these figures indicate the geometric and other relationships necessary to ensure a good metallurgical bond. The insert ring 45 has an upper surface 47 which cooperates with its remaining configuration, which will be described later by reference to the remaining figures. However, this surface 47 is impressed or sinks into the cylinder head casting material 22 as shown by the dimension indicated "specified range of the shrinking amount" depicted in FIG. 3. The result of this shrinking depends upon the amount of plastic deformation of the cylinder head material 22. As will become apparent, it is desirable to provide minimal liquification and plastic deformation of the material of the cylinder head casting 22 without significant melting of it. Also, if the melting is substantially eliminated or only occurs over a relatively thin surface area, then no material defects will result, thermal-conductivity will be high and the resulting valve seat will be firmly bonded into place. Therefore, in accordance with a facet of the invention, the amount of sinking of the insert ring 45 into the base cylinder material 22 is limited to the range indicated in FIG. 3 and which amounts to certain values in relation to overall configurations as will be described.

Figure 4A:
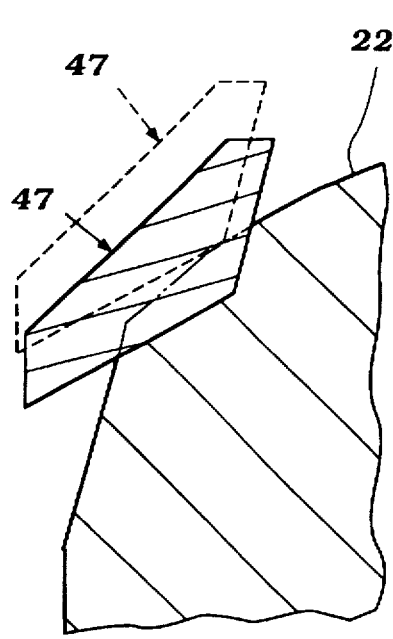
FIG. 4 is a cross-sectional view, in part similar to FIG. 3, and shows in portion a the result of a joint wherein there is insufficient sinking of the insert ring into the cylinder head on the left side a view and on the right-hand side in view b, the situation wherein there is too great a sinking of the insert ring into the cylinder head.

The left-hand side of FIG. 4 indicated as view a indicates a situation wherein the insert ring 45 is not deeply sunk or embedded into the base cylinder head material 22. As a result of this, two major defects will be potential. First, there will be a small bonded surface area between the insert ring 45 and the base cylinder head material 22. This results in a reduced bonding area even if the bond is totally acceptable. Also, a large amount of the insert ring 45 will have to be machined away and this results in a wastage of material, a possibly reduced valve seating area and large processing time.

Figure 4B:
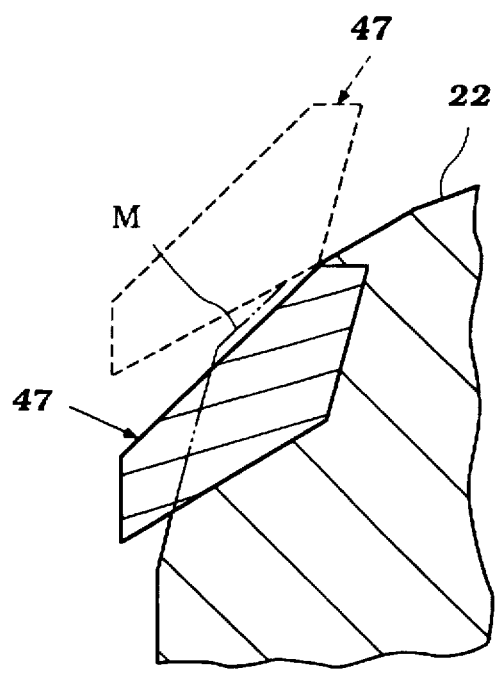

On the other hand, if the embedding or sinking of the insert ring 45 is too great, as shown in FIG. 4b, then another problem will occur. In this instance, a portion of potential seating surface indicated at M will be lost and, as a result, a gap may be produced between the valve seat surface and the head of the valve resulting in reduced effectiveness of the valve seating area.

Figure 5A:
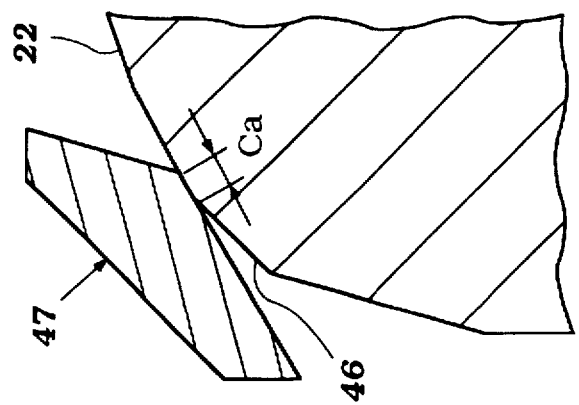
FIG. 5 is a serial of cross-sectional views showing the affects of variations in placing of the insert ring relative to the cylinder head material due to machining tolerances and showing how the different contact areas will result in different amounts of heat generated and, accordingly, variations in the amount of sinking of the insert ring during the bonding process.
Figure 5B:
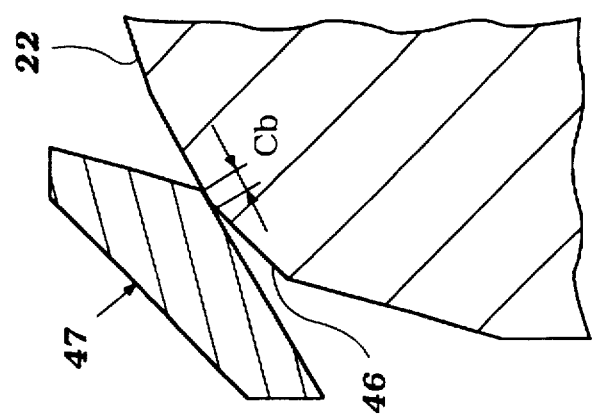
Figure 5C:
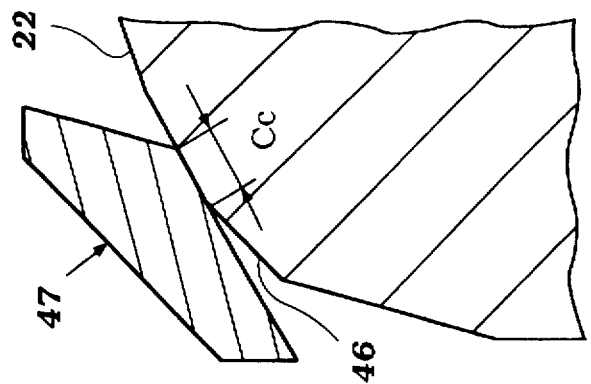

FIG. 5 shows three views that illustrate the difference between the initial contact area of the insert ring 47 and the cylinder head 22, and, specifically, the recessed portion 46 thereof. If the contact area is a shown in view a as the amount $C_a$, there will be a certain degree of heat generated due to a given electrical potential and this will then cause a certain initial melt and control the total depression. However, if the contact area is lesser, as seen in $C_b$ in FIG. b, then the electrical heat will be greater and there may be more localized melting with a minimum or lesser amount of settling or sinking. However, if the area is greater, as at $C_c$, in FIG. 5c, then the amount of heat will be too low and there will be inadequate sinking and minimized contact area.

Another condition is shown in FIG. 6. This figure shows that the insert ring 45 has a pair of angularly inclined surfaces 48 and 49, as noted in the previous figures, but not identified by separate reference numerals therein. In this condition, the angular position is such that, during subsequent sinking due to melting as shown in FIG. 6b, the insert ring surface 49 will contact a larger portion of the cylinder head material at the area at the upper portion of the joint, and there will be a large melt area M which will result in the problems of voids due to excess melting and possible gas intrusion due to this excess melting. This could eventually cause separation particularly after extended running. This problem is more acute on the exhaust valve side due to the higher temperatures experienced in that area.

Thus, from the foregoing description, it should be apparent the shape and pressing technique is very important. The invention, therefore, deals with the particular shape of the insert ring 45 and the corresponding shape of the recess 46 in the cylinder head 22 and which results in an improved final joint and minimum of variations due to manufacturing tolerances. Also involved is the pressing and bonding technique where better and more uniform temperature control are achieved. This construction and method will now be described by primary reference starting with FIG. 7.

The construction of the insert ring 45, its shape and the shape of the cooperating recess 46 formed in the cylinder head at the port 26 of the intake passage 25 will now be described by primary reference initially an enlarged cross-sectional view of one of the intake valve seats 27 and this description may be considered to be typical for that which may be utilized with the exhaust valves 38 to form the exhaust valve seats 36.

The insert ring 45 is bonded to the cylinder head material 22 by a relatively thin metallurgical bonding layer that is formed in a manner which will be described. Adjacent this bonding layer, there is formed a portion of the material of the cylinder head 22 which has been plastically deformed. It should be noted that the alloy of the cylinder head 22 is of the same chemical composition and same physical structure, except for being slightly work hardened in the area adjacent the bonding layer, as in the remainder of the cylinder head material 22.

The insert ring 45, is formed from a Sintered ferrous alloy base 51 having a coating material filled within its intercices and also on its external surface as desired, which coating is indicated at 52. This material is preferably formed from a good electrical conductor such as copper. Copper also has another useful function as a coating for a reason to be described.

The insert ring 45 in accordance with this embodiment is formed with a cylindrical inner surface 53 that is relatively short in axial length and which merges into a tapered conical surface 54 which extends for a substantially length. The surface 54, which is actually the pressing surface, as will be described, ends in an end surface 55.

The aforementioned first, conical outer surface section 49 extends at an acute angle to the axis of the cylindrical section 53 and merges at a sharp edge with the aforementioned inclined lower end surface 48 which is formed at a greater angle than that of the conical surface 49. However, this angle is still an acute angle to a plane perpendicular to the axis of the cylindrical section 53.

The cylinder head material 22, preferably as cast but also which can be machined, is formed with the recess 46 that is comprised of a first section 56 that is connected to a second section 57 that are joined by a surface that extends generally perpendicular to the axis of the port 26 and which forms a ledge 58 that contacts the inclined inner portion 48 of the insert ring 45 upon initial installation. This tends to form a localized area that will begin the plastic deformation phase.

It has been noted that the copper coating serves the function of improving the electrical conductivity of the insert ring 45. Also, it has been noted that the copper performs additional functions. As should be apparent from the foregoing description, it is important that the bonding process not result in any alloying of the insert ring material and specifically that of the base 51 with the base material of the cylinder head 22.

The copper also serves the function of forming a eutectic alloy with the material of the cylinder head 22 which eutectic alloy has a lower melting point than either the melting point of the copper or that of the cylinder head material. As a result, the plastic deformation is accomplished with added ease and the metal can flow out during the pressing process as will be noted without large heat generation. In addition, the copper will react with any aluminum oxides that may be present on the surface of the recess 46 of the cylinder head 22 so as to extrude these oxides and provide a purer finish.

Preferably, the copper plating is done by electroplating and has a thickness in the range of 0.1–30 μm. Also, the cylinder head material of the body 22 is, as noted, preferably an aluminum alloy as set forth in Japanese Industrial Standard (JIS) AC4C. Also the AC4B and AC2B aluminum alloys or other light alloys may be utilized.

Figure 7:
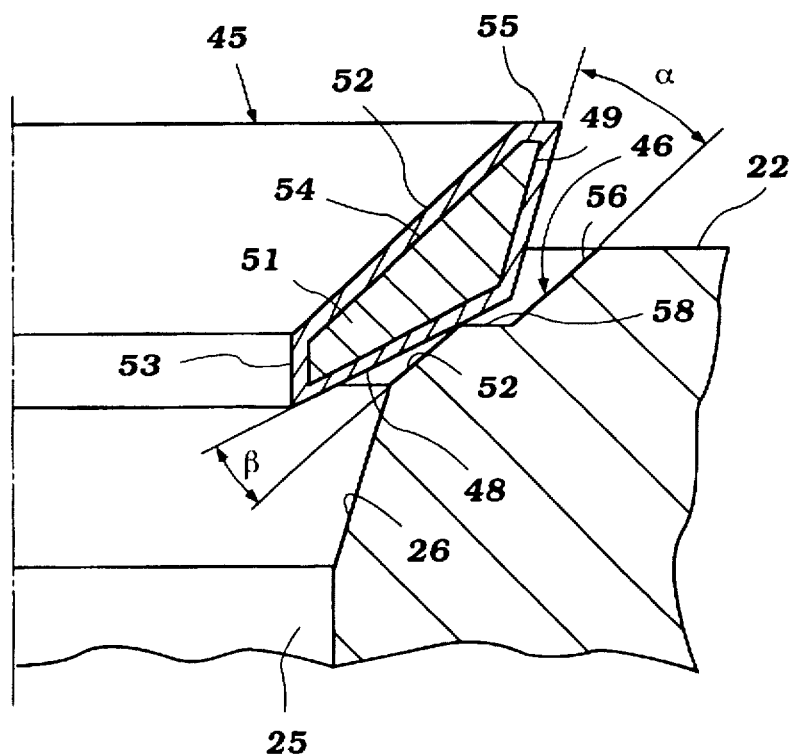
FIG. 7 is a cross-sectional view showing a preferred embodiment of the invention and illustrates the initial position of the insert ring prior to its being embedded or sunk into the cylinder head material.

Continuing to refer to FIG. 7, the angular relationship between the cylinder head recess surface 57 and the insert ring surface 48 and the cylinder head recess surface 46 and the insert ring outer conical section 49 is important. The angle β between the former surfaces (48 and 57) is substantially smaller than the angle α between the surfaces 49 and 56. As a result of this, during the initial bonding process, there will be a lower degree of melting in the area of the cylinder head surface 56 thus avoiding the high melt area indicated at M in FIG. 6.

Figure 8:
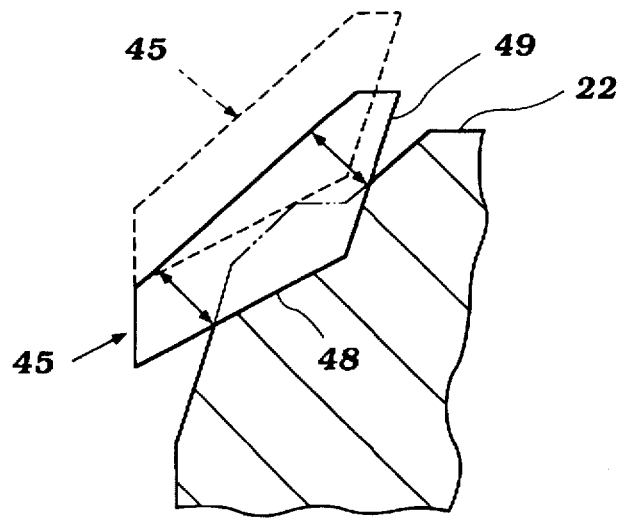
FIG. 8 is a cross-sectional view, in part similar to FIG. 7, and shows the resulting embedding of the insert ring into the cylinder head and depicts how the problems of the prior art are avoided. This view shows an intermediate step in the bonding process.

As may be seen from FIG. 8, during the embedding process, these surfaces will have a relatively small contact area and hence there will not be a great amount of heat generated in this area where little plastic deformation is required. As a result, the melting in this area will be substantially reduced. There are also certain other dimensional aspects of the insert ring 45 that are significant and these will be described later after the actual bonding action is performed.

Figure 9:
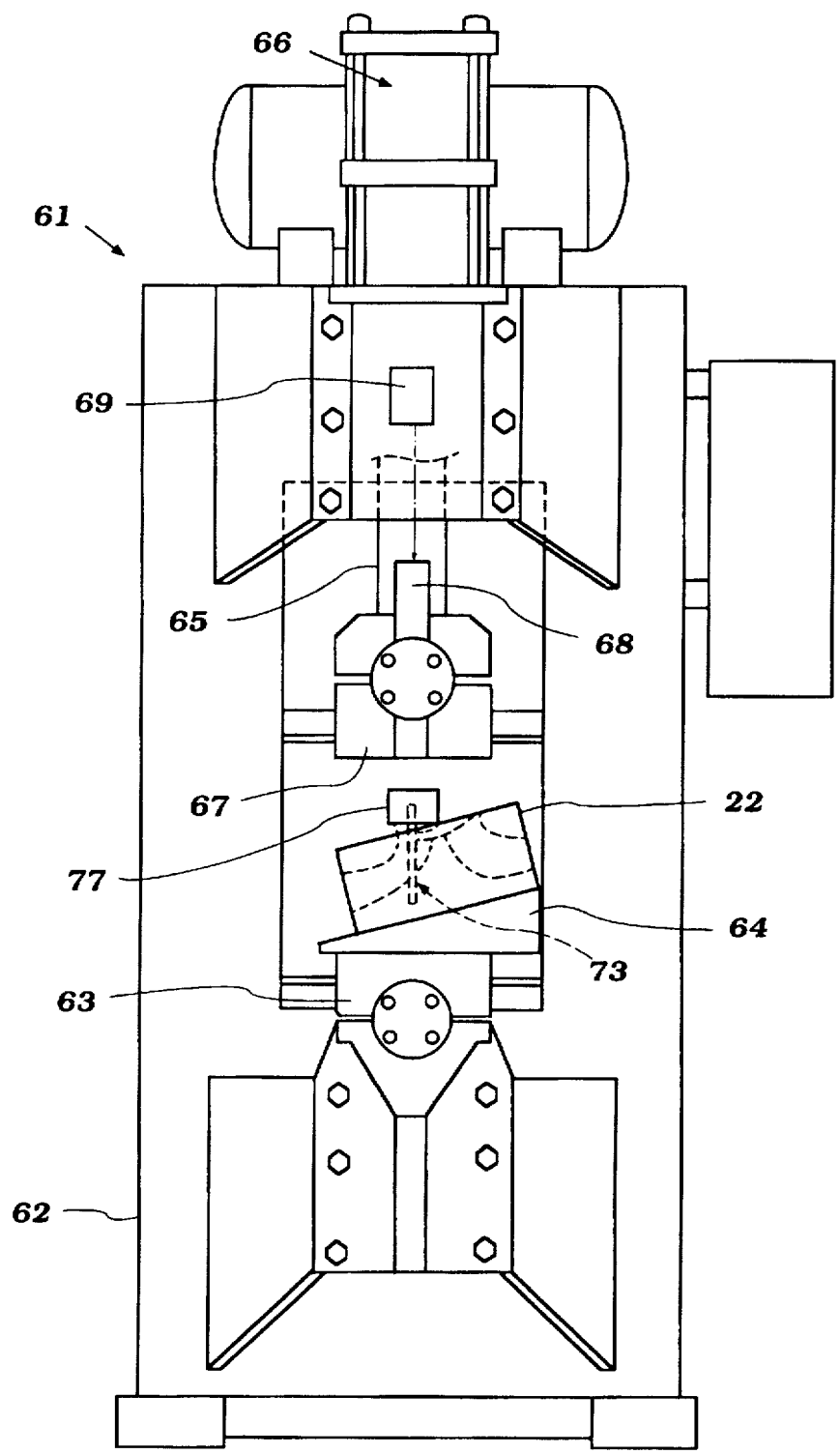
FIG. 9 is a front elevational view of a bonding apparatus utilized to practice the invention.
Figure 10:
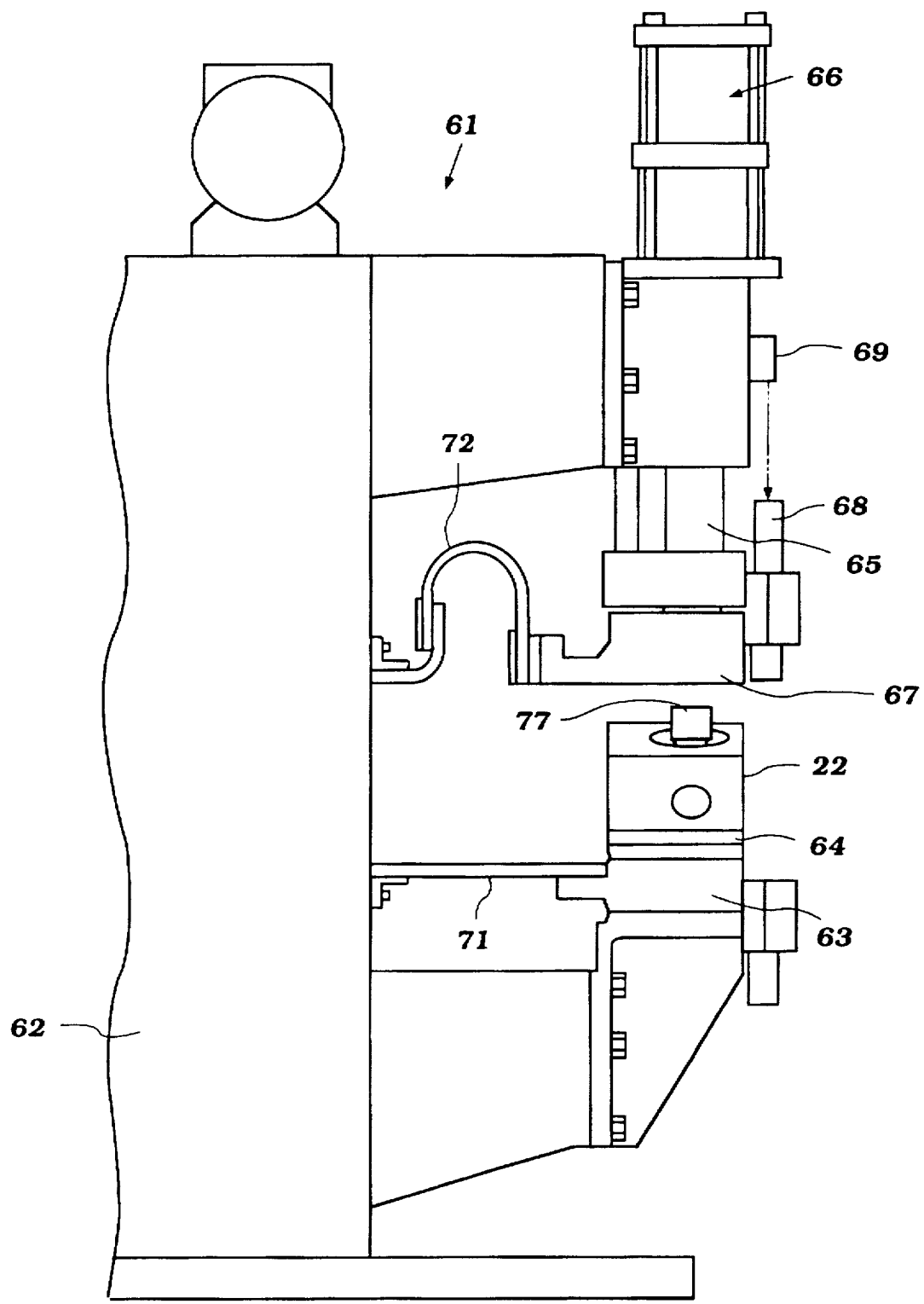
FIG. 10 is a side elevational view of the bonding apparatus.
Figure 11:
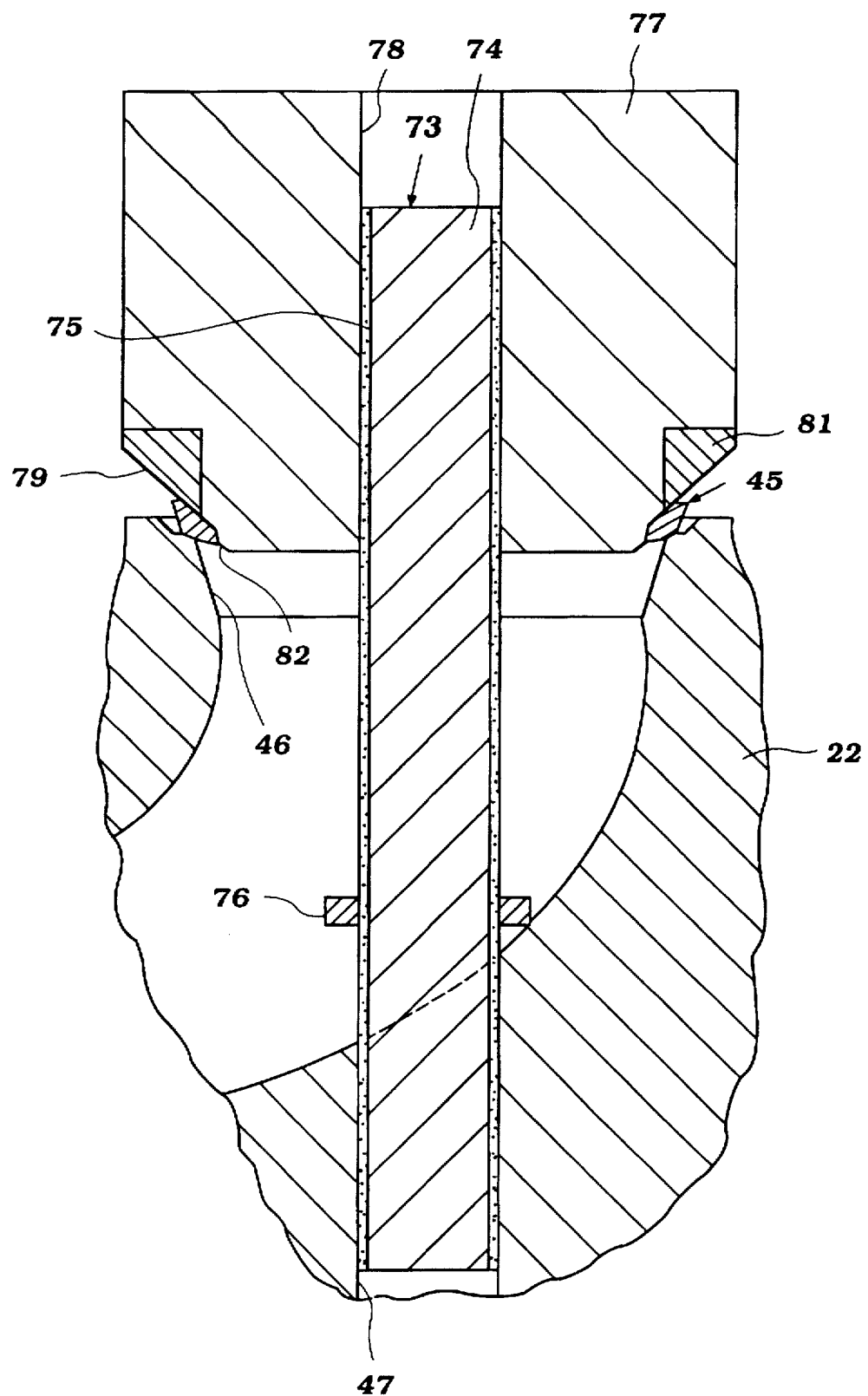
FIG. 11 is an enlarged cross-sectional view taken through the elements of the bonding apparatus in the vicinity of the valve seat and at the start of the bonding process.

The bonding apparatus is shown best in FIGS. 9–11 and will be discussed and described by reference to these figures. The apparatus is indicated generally by the reference numeral 61 and may be considered to be similar to a pressure welding apparatus. However, and as will become apparent, the actual electrical current flow is not sufficient to cause any welding of the insert rings 45 to the cylinder head material 22. The apparatus 61 is comprised of a press base 62 that has a support element 63 on which a fixture 64 is mounted so as to accommodate the base cylinder head 22. The fixture 64 is disposed so that the cylinder head 22 will be held at an angle. This angle is such that one of recesses or cavities 33 (FIG. 1) that received the valve guides 32 or 41 will be in line with the pressing axis of the equipment. The actual axis of the pressing direction is determined by a reference axis defined by the cylinder head casting 22.

Supported above the table or base 63 is a ram 65 which is driven by a hydraulic or pneumatic motor 66. The ram 65 carries a pressing electrode member, indicated generally by the reference numeral 67.

Affixed to the pressing electrode member 67 is an adjustable post 68 which cooperates with a proximity sensor or detector 69 such as a laser which is utilized to determine the degree of movement during the pressing of the inserts in place and the degree of movement of the ram 65 specifically. The output of this detector 69 indicates the depth at which the insert is pressed into the cylinder head, as will become apparent.

The base 62 carries a source of high energy electricity that is transmitted to the base plate 63 through a first conductor 71 and to the pressing member 67 through a second conductor 56. The conductors 71 and 56 will accommodate vertical movement and the conductor 56 is so configured in this embodiment. The pressing electrode 67 is preferably charged positively and the support base 63 is negatively charged.

The actual pressing apparatus and its association with the cylinder head will now be described by reference FIG. 11. As seen in this figure, a mandrel post, indicated generally by the reference numeral 73, is placed into the valve guide opening 33 of the cylinder head 22. The mandrel post 73 is formed from a central post part 74 that is formed from a suitable material, such as a metallic rod. However, in order to provide electrical insulation, for a reason which will become apparent, the rod 74 is provided with an insulating coating 75. Although the insulating coating 75 may be of any material, a ceramic material, such as alumina, is preferred. The alumina coating 75 is flame sprayed onto the rod base 74 and then is finished by polishing.

A stopper ring 76 is affixed to the mandrel 73 and contacts the inner surface of the cylinder head intake passage 25 around the valve guide opening 33 so as to limit how far the mandrel post 73 extends into the valve guide opening 33.

A further pressing member, indicated generally by the reference numeral 77, is provided with an opening 78 complementary in shape to the mandrel and is slid thereover. The pressing member 77 has an actual pressing surface that is formed by a hardened body 79 formed from an appropriate material and which either is magnetized or which carries a magnetic body 81 so as to attract and hold an insert ring 45 thereupon. The body surface 79 is formed with a tapered end 82 that is complementary to the shape of the insert ring 45. Because the pressing body 77 is engaged the electrode 67, electrical current will flow through the pressing body 77 and through the insert ring 45. As will become apparent later, when the insert ring 45 is engaged with the cylinder head 32, an electrical path will be formed through the cylinder head and base 63 to the conductor 71 to complete the electrical path. The insulated coating 75 on the mandrel 73 prevents short-circuiting around this area.

Beginning now to describe the pressing operation by reference to FIGS. 7 and 12 through 16. FIG. 7 shows the conditions comparable to that in FIG. 11. The pressing force is then applied by actuating the hydraulic ram operating motor 66 so as to move the electrode 67 into contact with the pressing mandrel electrode 77. Prior to this the mandrel 77 may be rotated to ensure that the insert ring 64 is correctly seated.

Figure 16:
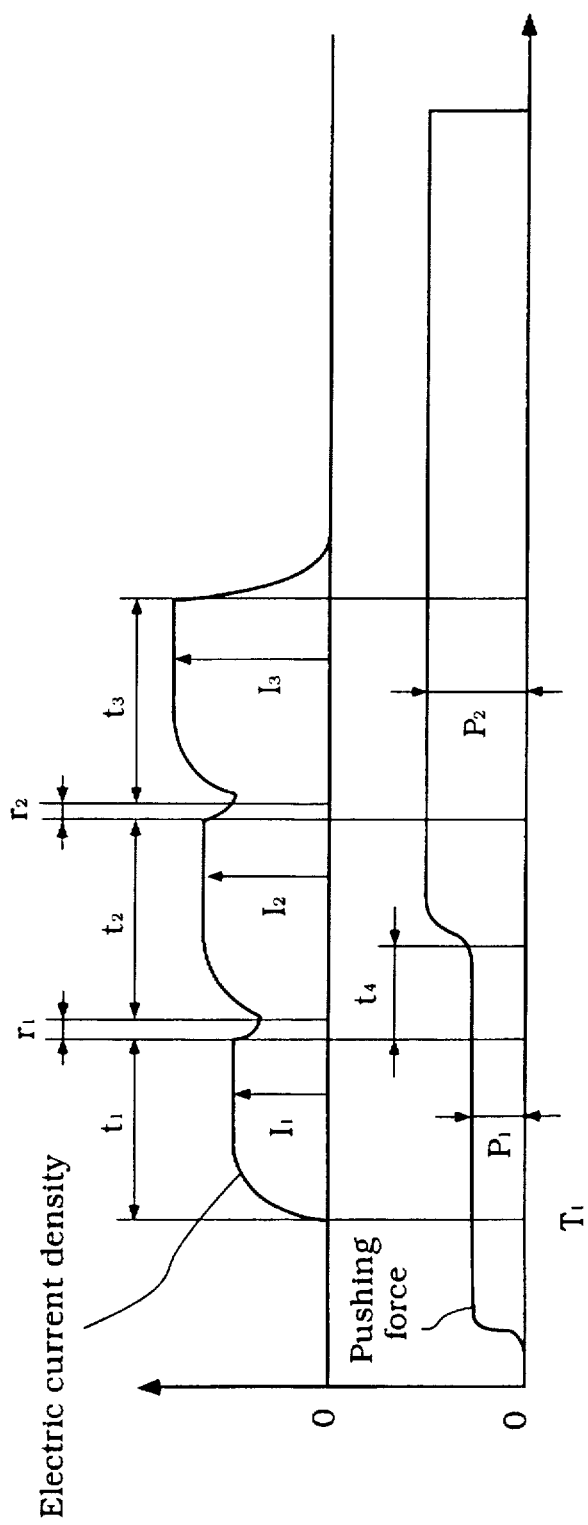
FIG. 16 is a graphical view showing the relationship of the applied electrical current and pressing forces during a preferred bonding technique.

A pressing force is then applied at a force indicated at the force P1 in FIG. 16. This force acts along an axis defined by the axis of the valve guide opening 33. This pressing axis will be coincident with the final axis of the valve seat 27. The initial pressing force $P_1$ that is applied is held and the sensing device 67 which cooperates with the post 68 is measured until it is determined that the insert ring 45 has bottomed in the recess 46, this being the position shown in FIG. 7. This is also recorded as the starting point for measurement of the total shrinking of the insert ring 45 into the cylinder head material 27.

The pressing force is then continued until the time T1 wherein an electric current flow in the amount $I_1$ through the joint is initiated. When this occurs, there will be a high electrical resistance due to the small contact area and a plastic deformation begins in the range indicated at A in FIG. 12 so as to displace the material of the cylinder head 22.

Figure 12:
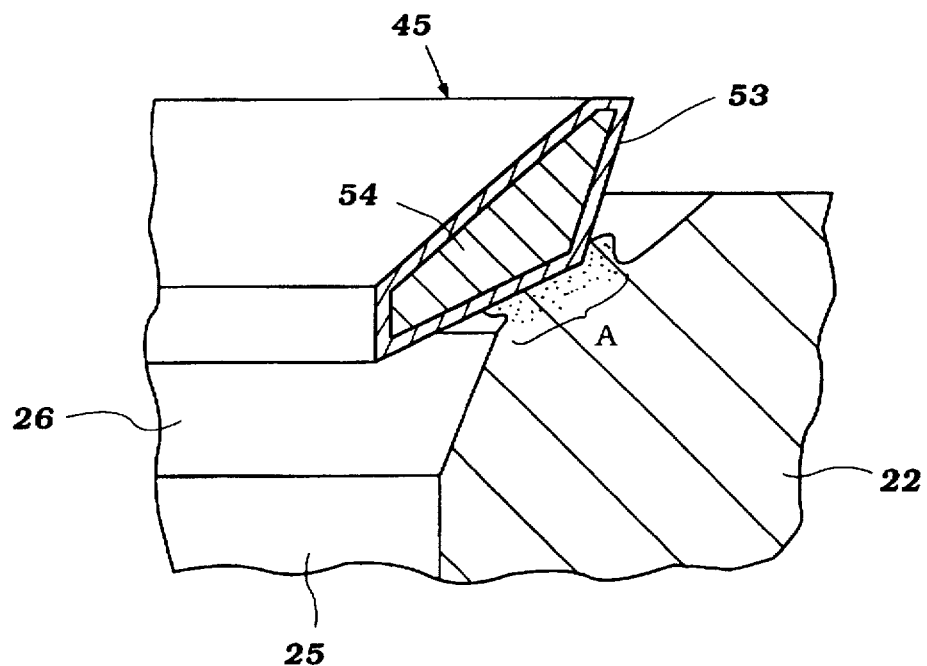
FIGS. 12–15 are cross-sectional views taken through the valve seat during the bonding process and represents steps that follow the position shown in FIG. 7 to describe how the bond is formed with FIG. 15 showing the final machined valve seat.

As the current is built up, the material will reach a temperature wherein the internal resistance is high enough to cause the copper coating layer 53 to defuse into the cylinder head material in the area in the range A so as to form the eutectic alloy that results in the area indicated at A in FIG. 12 and which eventually causes displacement and a plastic deformation and the valve seat 45 will begin to become embedded in the material of the cylinder head 22.

Figure 13:
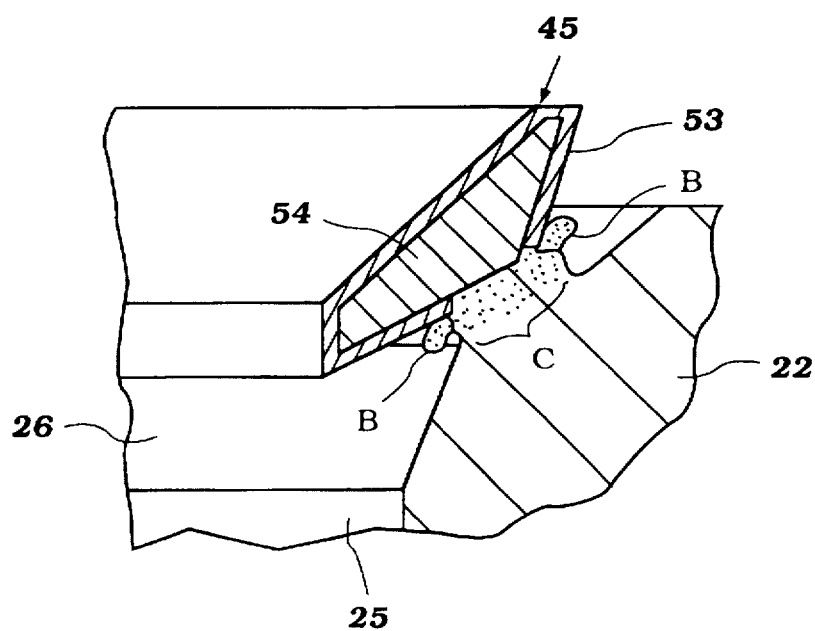

The eutectic layer is displaced as indicated at B in FIG. 13 toward the area which will be removed from where the final valve seat will be formed. Said another way, this material will be later machined away. During the pressing and application of electrical current, the pressing pressure p and the electrical current density I are varied in accordance with the routine shown in FIG. 16. This routine is chosen so as to maintain the desired temperature of the molten phase of the liquid while still assuring that excess melting will not occur. Thus, after the initial application of electric current flow at the amount $I_1$ the current density is maintained for a time $t_1$. The pressing pressure $P_1$ is maintained constant at that time. Thereafter, there is a relaxation in the current density wherein the current is dropped gradually over the period r1. After this drop, then the current density is gradually built up again to a new level $I_2$ which is slightly higher than the level $I_1$. This current level is maintained for the time period $T_2$.

The pressing pressure $P_1$ is maintained for a time period t4 after the beginning of the initial relaxation period r1. The pressing pressure is then built up to a new higher pressure $P_2$ and this is held throughout the remainder of the pressing process.

During the higher current flow $I_2$ and after a time $T_2$, a further rest period is begun and held for the time $R_2$. After this time, the electric current is again built up to a new somewhat higher density $I_3$ and this is held for a time period $T_3$.

These current flows and time periods are altered from the intake side to the exhaust side in accordance with the following relationships:

Electric current value I
  Intake port side 26. $I_1$=64kA, $I_2$=68kA, $I_3$=72kA
  Exhaust port side 35. $I_1$=70kA, $I_2$=75kA, $I_3$=80kA
The volt current drop during the resting periods are all approximately 4kA.
Time periods (same for both intake and exhaust)
  $T_1$, $T_2$, $T_3$=0.1 seconds
  $T_4$=0.5 seconds
  $R_1$, $R_2$=0.01 seconds
Pressing forces (same for both intake and exhaust sides).
  $P_1$=12kN
  $P_2$=24kN During this process, the melt level moves outwardly and the eutectic alloy is displaced as indicated at B beyond the joint area, while in the area C a metallurgical bonding will occur. There are basically, however, no alloying of the material of the insert ring base 54 to the cylinder head base material 22. Also, because of the displaced location with the contact occurring first along the insert ring surface 48 and as seen in FIG. 8, the heat build-up on the outer peripheral edge of the insert ring 45 and cylinder head 22 in the area of the valve seat 27 will be kept relatively low and, hence, there will be no substantial melting occurring in this area beyond that necessary to achieve the metallurgical bond. During this operation, the sinking rate is continuously monitored and it will be ensured that the depression is not occurring too rapidly and also is occurring sufficiently so as to provide the desired strength.

It should be noted that, because of the inter-alloying that occurs between the copper and the base materials, the temperature of phase change will be lower than that of either the copper or aluminum alloy of the cylinder head by itself and, thus, the diffusion and bonding will be very effective. As has been discussed earlier, the characteristic of the base cylinder head material 22 is not changed, except there will be some work hardening in the area of the joint which further improves the strength of the joint.

Figure 14:
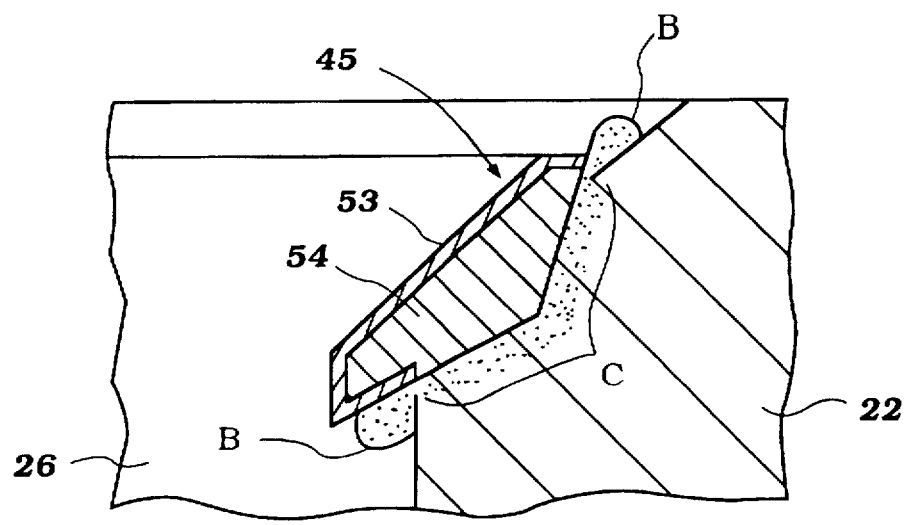

This operation continues up until the point shown in FIG. 14 at which time the insert ring 45 will be substantially sunk into its desired finished configuration.

Figure 15:
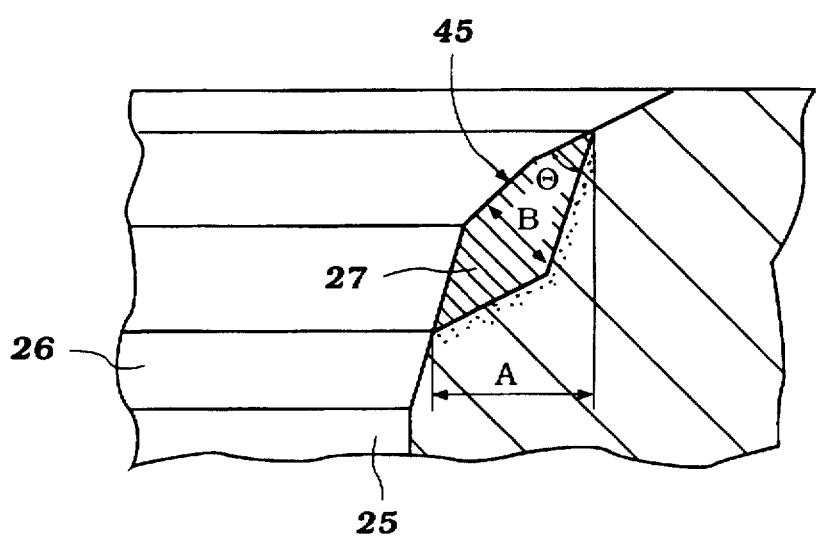

There is then a finished machining of the joint occur as shown in FIG. 15 so as to produce the resulting valve seat 27. The final joint appears as shown in FIG. 14 and it will be seen that substantially all of the eutectic alloy has been pushed from the area between the insert base 45 and the base cylinder head material 22 resulting in only the work hardened adjacent the joint and atomic bonding in the area C. In addition, the metallurgical bonding will be completed.

During this time and after the completed bonding, the apparatus measures the amount of actual embedding of the insert ring 45 into the cylinder head 22. There is an allowable range as indicated by the dimension in FIG. 3 which range is about 0.5 millimeters to 2.5 millimeters and preferably in the range of 1 to 1.5 millimeters. If the sinking level is not reached in this range, then it can be assumed that the joint is not satisfactory. This judgment may also be made during the actual pressing, bonding operation. If the deflection is not in the proper range, the process may be discontinued.

In addition, a judgment may be made whether the main current values and total energization time are in the allowable range. If this is also met, then certain cylinder head valve seats may be actually pull testing to assure accuracy and satisfaction of the entire lot of cylinder head formed.

In addition to these tests, there can be a heat endurance test and/or heat shock test applied to the finished cylinder head. All of these things are done before the final machining.

There are certain dimensional characteristics which should be present in the final bonded valve seat 27. As has been noted from the previous discussion, certain features are important in the initial configuration so as to ensure that the cylinder head material 22 is uniformly liquefied in the area of the joint, and the shape of the insert ring 45 relative to the recess 46 is important in achieving this result, particularly the resulting configuration that permits the situation shown in FIG. 8 to exist wherein there will not be too high a melting toward the outer peripheral edge of the joint as occurred with prior art constructions.

Figure 17:
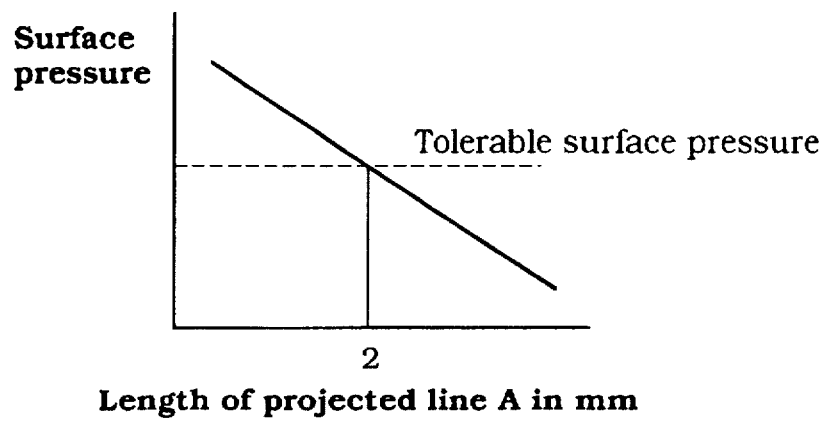
FIGS. 17–19 are graphical views showing, respectively, the surface pressure with respect to the projected length of the insert, the bending deformation factor relative to the thickness of the insert, and the probability of separation relative to an angle of the cylinder head recess.
Figure 18:
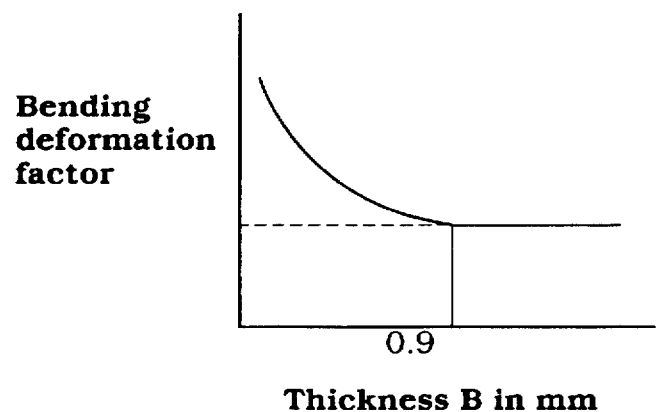
Figure 19:
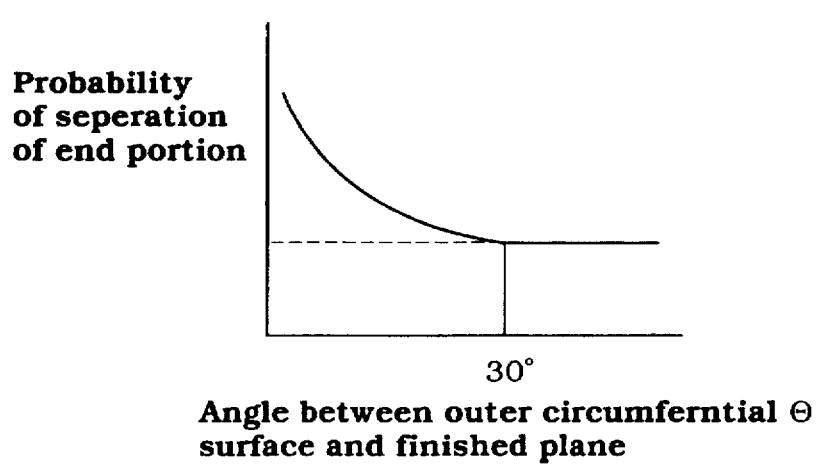

Referring specifically to FIG. 14, there are two length dimensions shown and also one angular relationship. The length dimension A indicates the projected length of the remaining portion of the insert ring 45 in the finished joint 27. As may be seen in FIG. 17, this length determines the surface pressure which will be exerted during the seating impact with the cooperating valve head. As may be seen, the greater the length, the lesser the surface pressure. However, it is also desirable to maintain this distance as small as possible and, thus, by selecting the dimension of 2 mm as the maximum dimension for A, it is possible to maintain a tolerable surface pressure and still keep relatively small valve seats and, thus, permit the valve opening area to be maximum.

The dimension B deals with the bending deformation factor below which reduces the likelihood of separation. Again, if the thickness is kept at least equal to about 0.9 mm, then the desired strength can be achieved without again making the insert too large.

Finally, the angle θ is important in determining the strength and likelihood of separation at the outer peripheral edge of the joint during running. As may be seen if the angle is increased up to about 30°, the maximum strength is obtained. By further increasing the angle, not significant strength gains result and, hence, a compact structure can be maintained if the angle θ is maintained no less than about 30° and, preferably, not significantly greater than this angle.

Of course, the foregoing description is that of preferred embodiments of the invention, and various changes and modifications may be made without departing from the spirit and scope of the invention, as defined by the appended claims.

What is claimed is:

1. A method for forming and bonding a valve seat in a cylinder head, said cylinder head comprising a casting having a flow passage extending therethrough and terminating at a valve port in a combustion chamber surface thereof and an insert ring secured by metallurgical bonding into said valve port, said method comprising the steps of forming a recess at said valve port comprised of a pair of angularly inclined portions joined by a generally planar section extending perpendicularly to the axis of said valve port, forming said insert ring with a pair of angularly inclined outer surfaces joined at an apex, positioning said insert ring into said recess so that the radially inner peripheral edge of said planar section of said casting recess is engaged by the radially inward most angularly inclined outer surface of said insert ring, and pressing and applying heat to said insert ring and said cylinder head for forming a metallurgical bond therebetween.

2. A method for forming a bonded valve seat insert as set forth in claim 1, wherein the angle between the radially inward angularly inclined outer surface of the insert ring and the radially inward angularly inclined portion of the cylinder head recess is no greater than the angle between the radially outer angularly inclined outer portion of said cylinder head recess and the radially outward angularly inclined outer surface of said insert ring.

3. A method for forming a bonded valve seat insert as set forth in claim 2, wherein the angle between the radially inward angularly inclined outer surface of the insert ring and the radially inward angularly inclined portion of the cylinder head recess is substantially less than the angle between the radially outer angularly inclined outer portion of said cylinder head recess and the radially out d angularly inclined outer surface of said insert ring.

4. A method for forming a bonded valve seat insert as set forth in claim 3, further including the step of machining the insert ring in the cylinder head after the completion of the bonding so that the thickness of the insert ring in a direction perpendicular to the valve port is equal to "A" and the maximum thickness of the insert ring is "B" and wherein "A" is equal to 2 mm and "B" is equal to about 0.9 mm.

5. A method for forming a bonded valve seat insert as set forth in claim 1, further including the step of machining the insert ring in the cylinder head after the completion of the bonding so that the thickness of the insert ring in a direction perpendicular to the valve port is equal to "A" and the maximum thickness of the insert ring is "" and wherein "A" is equal to 2 mm and "B" is equal to about 0.9 mm.

* * * * *

UNITED STATES PATENT AND TRADEMARK OFFICE
CERTIFICATE OF CORRECTION

PATENT NO. : 5778531
DATED : July 14, 1998
INVENTOR(S) : Inami et al

It is certified that error appears in the above-identified patent and that said Letters Patent is hereby corrected as shown below:

ON THE TITLE PAGE:

After item [22], Please add the Foreign Application Priority Data

September 14, 1995 [JP] Japan .................. 7-237264

Signed and Sealed this

Thirtieth Day of November, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO.   : 5,778,531
DATED        : July 14, 1998
INVENTOR(S)  : Inami et al.

It is certified that error appears in the above-identified patent and that said Letters Patent is hereby corrected as shown below:

Column 12, Claim 3,
Line 15, "radially out d angularly" should be -- radially outward angularly --.

Claim 5,
Line 29, "insert ring is """ and" should be -- insert ring is "B" and --.

Signed and Sealed this

Ninth Day of October, 2001

*Attest:*

NICHOLAS P. GODICI
*Attesting Officer    Acting Director of the United States Patent and Trademark Office*